April 6, 1965 P. MEISNER ETAL 3,176,349
PLASTIC FILM FORMING APPARATUS
Filed Dec. 26, 1962 4 Sheets-Sheet 1

INVENTORS
PAUL MEISNER
FRED A. GROTH
BY
Ooms, McDougall & Hersh
ATT'YS.

INVENTORS
PAUL MEISNER
FRED A. GROTH
BY Ooms, McDougall & Hersh
ATT'YS.

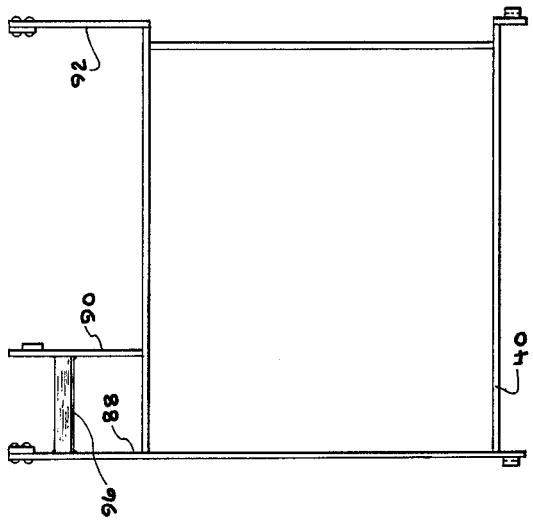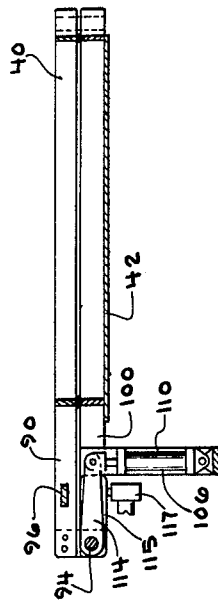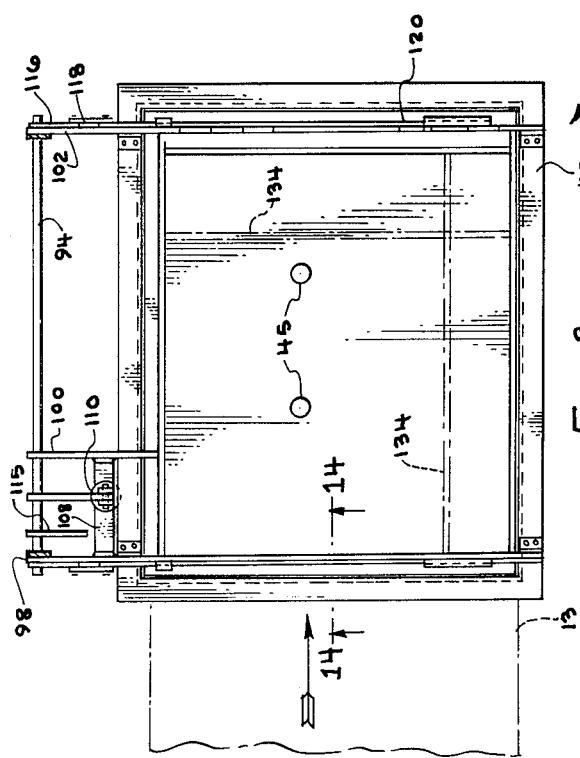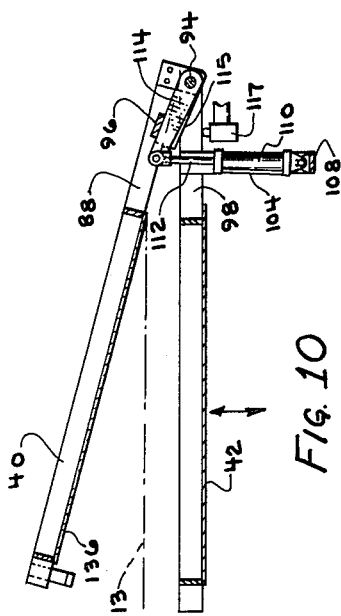
INVENTORS
PAUL MEISNER
FRED A. GROTH
BY Ooms, McDougall & Hersh
ATT'YS.

April 6, 1965 P. MEISNER ETAL 3,176,349
PLASTIC FILM FORMING APPARATUS
Filed Dec. 26, 1962 4 Sheets-Sheet 4
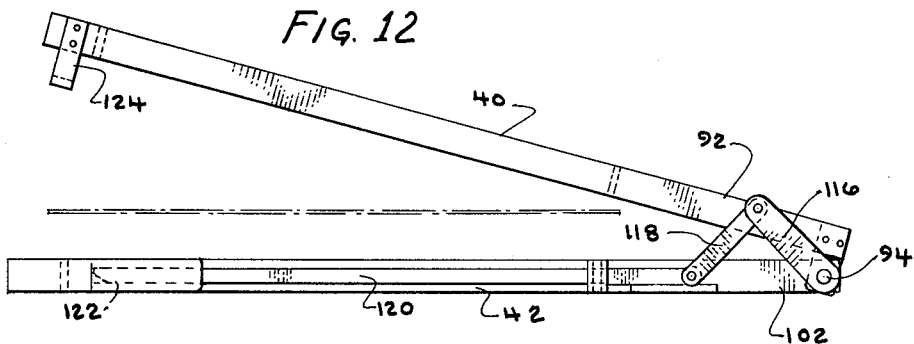
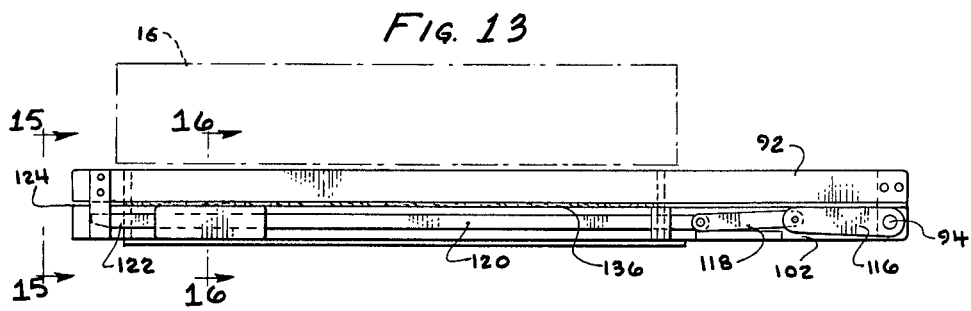
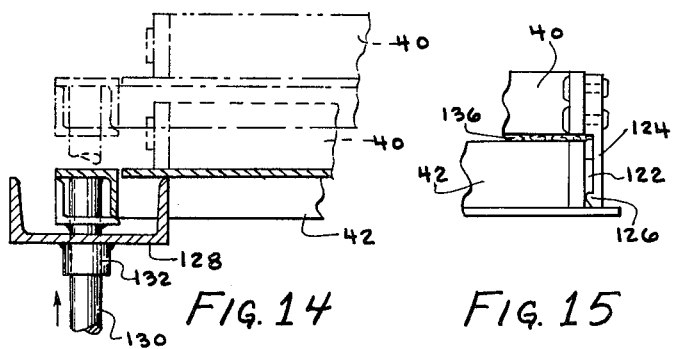
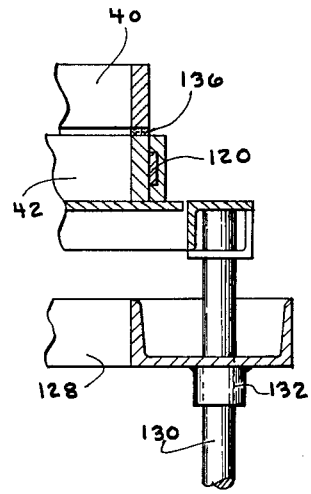
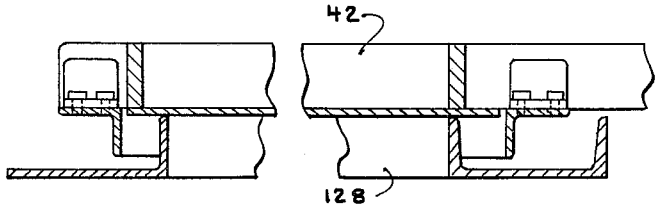
INVENTORS
PAUL MEISNER
FRED A. GROTH
BY
Ooms, McDougall & Hersh
ATT'YS.

United States Patent Office 3,176,349
Patented Apr. 6, 1965

1

3,176,349
PLASTIC FILM FORMING APPARATUS
Paul Meisner, Park Forest, and Fred A. Groth, Chicago, Ill., assignors, by mesne assignments, to Dynamics Corporation of America, a corporation of New York
Filed Dec. 26, 1962, Ser. No. 247,065
9 Claims. (Cl. 18—19)

This invention relates to an apparatus useful for the forming of plastic film into various shapes.

There are many devices available which are adapted to receive sections of plastic film and which are capable of forming the film into various configurations. In one specific application of such forming means, the plastic film is utilized for enclosing articles associated with the film forming means whereby protection of the articles can be accomplished. In this application, the transparent characteristics of the plastic film enable the articles enclosed in the plastic to be viewed while still providing the desired protection.

It is an object of this invention to provide a system for the forming of plastic film which is characterized by a highly efficient operation whereby the forming of the plastic can be accomplished rapidly and in an economic manner.

It is a further object of this invention to provide an apparatus of the type described which is characterized by a substantially completely automatic operation and which is relatively simple in construction whereby an extensive labor outlay and a large capital investment are not required.

These and other objects of this invention will appear hereinafter and for purposes of illustration but not of limitation, specific embodiments of this invention are shown in the accompanying drawings in which:

FIGURE 8 is a detail plan view illustrating the lower frame employed for holding a film section prior to a forming operation;

FIGURE 9 is a detail plan view illustrating the upper frame to be associated with the frame shown in FIGURE 8;

FIGURE 10 is a cross-sectional elevation of the assembled upper and lower frames in the open position;

FIGURE 11 is a cross-sectional elevation of the upper and lower frames in the closed position;

FIGURE 12 is a side elevation of the assembled upper and lower frames in the open position;

FIGURE 13 is a side elevation of the upper and lower frames in the closed position;

FIGURE 14 is a detail sectional view taken about the line 14—14 of FIGURE 8;

FIGURE 15 is a fragmentary view taken about the line 15—15 of FIGURE 13;

FIGURE 16 is a fragmentary sectional view taken about the line 16—16 of FIGURE 13; and, FIGURE 17 is a cross-sectional view illustrating the relationship of the lower frame member and the stationary structure of the apparatus prior to a forming operation.

Figure 1:
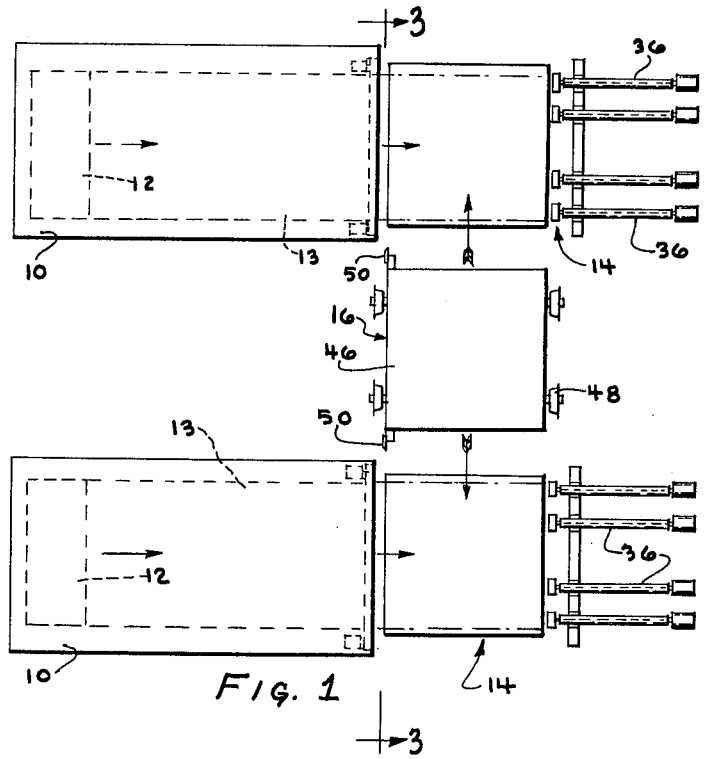
FIGURE 1 is a plan view of the film forming apparatus of this invention.
Figure 2:
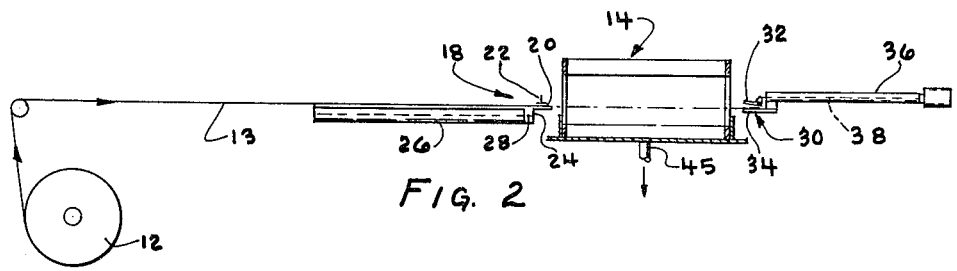
FIGURE 2 is a side elevation of the film forming apparatus with the housing structure removed.
Figure 3:
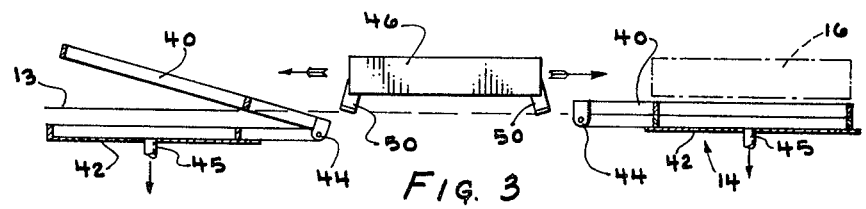
FIGURE 3 is an elevational view of the apparatus taken along the line 3—3 of FIGURE 1.

The apparatus of this invention generally comprises a film supply means which is adapted to position film whereby it can be located within a film forming station. In order to provide for proper location of the film, a first clamping means is adapted to move the film into the forming station. A second clamping means situated within the film forming station is adapted to engage the film therein and to hold the film during the forming operation. A suitable frame is provided for holding means which will ultimately determine the configuration to be assumed by the plastic film during the forming operation. The forming means, which may comprise a vacuum exerting means, are preferably associated with the frame means.

A heating means is utilized in the structure of this invention to heat the film section to be formed and to thereby enable the vacuum exerting means or other forming means to cause the film to assume the desired configuration. The present invention provides a movable heating means which is to be located over the film after the aforementioned clamping means locates the film in the forming position. Film cutting means are associated with the heating means and these cutting means operate to cut the film into the desired section sizes as the heating means is moved into position.

An important aspect of this invention concerns the use of a pair of forming stations situated on opposite sides of a single heating means. The aforementioned clamping means are associated with each of these stations and the heating means is adapted to move into association with each of the forming stations in an alternating cycle. This feature greatly improves the efficiency of the operation since the clamping means utilized for positioning a film section can be operating in one station while a forming operation is being carried out at the other station. With the use of a single heating means, a substantial increase in the production rate can be accomplished.

The accompanying drawings illustrate a film forming apparatus which includes housings 10 each containing film supply rolls 12. These supply rolls are adapted to provide film 13 for use at forming stations 14. A single heating means 16 is located between the forming stations in a manner such that it can be alternately employed at these stations.

Each of the forming stations 14 is provided with a first clamping means 18 adapted to engage the leading end 20 of the film 13. The clamping means comprise an upper bar 22 and a lower bar 24. A cylinder 26 and associated piston 28 are utilized for moving the clamping means 18 across the forming station whereby the leading end 20 can be placed in communication with second clamping means 30.

The clamping means 30 each comprise a plurality of jaw structures including an upper jaw portion 32 and a lower jaw portion 34. A cylinder 36 and an associated piston 38 are associated with each of the upper jaw portions 32 whereby clamping of the leading end of the film can be accomplished.

Each of the forming stations 14 includes frame members 40 and 42 which are pivotally connected at 44. The lower frame 42 is provided with an enclosed bottom and a vacuum connection 45 is operatively associated with this frame member.

The heating means 16 comprises the housing 46 having laterally disposed wheels 48 connected thereto. The wheels 48 are adapted to be moved over tracks (not shown) and during this movement, slitting blades 50 are provided for cutting the film into the desired sizes for forming.

Figure 4:
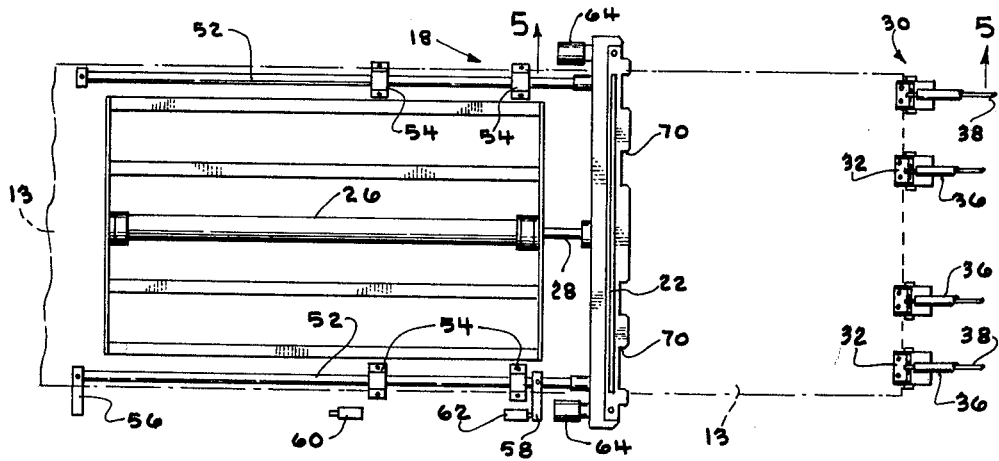
FIGURE 4 is an enlarged plan view of the clamping structures used for moving the film supply into position for forming.
Figure 5:
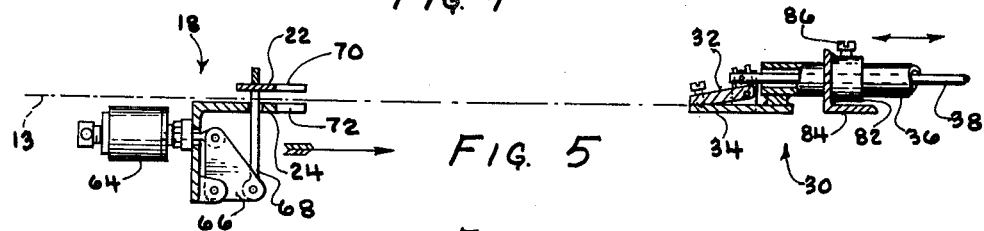
FIGURE 5 is a detail sectional elevation taken about the line 5—5 of FIGURE 4.
Figure 6:
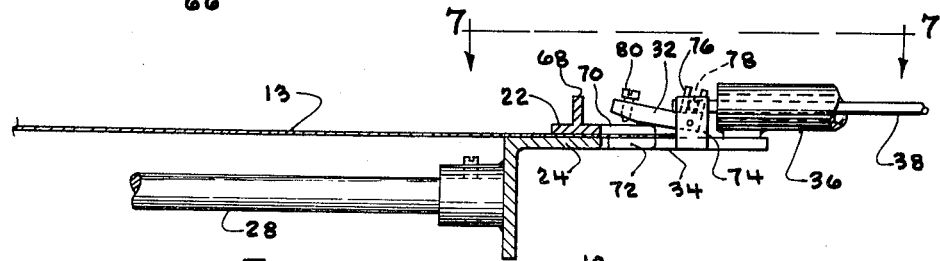
FIGURE 6 is an enlarged detail view illustrating the film clamping means as they appear after moving of the film supply into the forming position.
Figure 7:
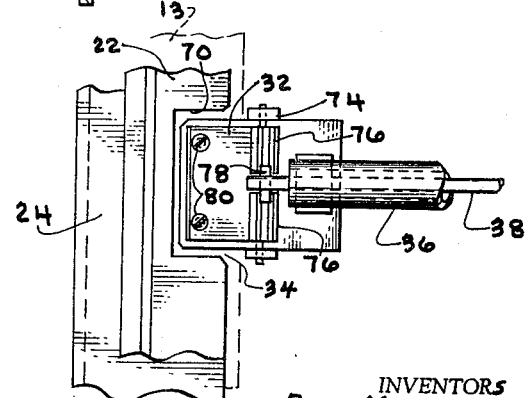
FIGURE 7 is a fragmentary view taken about the line 7—7 of FIGURE 6.

FIGURES 4 through 7 illustrate in detail the clamping means 18 and 30. The clamping means 18 includes a pair of rods 52 which are connected to the lower bar 24 and which are slideably received in guide members 54 mounted in the housing 10. Actuating means 56 and 58 are fastened to one of these rods and these actuating means are positioned to engage switches 60 and 62, respectively. The actuating means 56 controls the forward movement of the piston 28 since this means will engage the switch 60 when the piston has moved the clamping means across the forming station. The actuating means 58 serves to control the retracting movement of the piston 28 by energizing switch 62 when the piston returns the clamping means 18. It will be noted that the acutating means 56 and 58 can be adjusted on the rod 52 to provide for variable limits of travel of the piston 28.

Clamping cylinders 64 are mounted at either end of the bar 24 in the clamping means 18. These cylinders are adapted to actuate a bell crank 66 which provides for vertical movement of the rod 68. This rod is fixed to the movable clamping bar 22, and, therefore, operation of the cylinders 64 will move the bars 22 and 24 relative to each other. Cutout portions 70 and 72 are formed in the bars 22 and 24, respectively, in order to provide means for receiving the clamping means 30.

The upper jaws of the clamping means 30 are pivotally connected to the lower stationary jaws by means of upstanding arms 74 integrally formed with these lower jaws. The jaws 32 comprise a slotted portion defined by extensions 76, and pins 78 are received within these slotted portions. The pistons 38 are connected to these pins 78 whereby each of the jaws 32 can be moved relative to the stationary jaws 34. The extreme ends of the jaws 32 are provided with set screws 80 in order to permit a more secure grip of the film 13. The cylinder 36 which is fixed to the jaw 34 is mounted in a sleeve 82 secured to a mounting bar 84 which forms a part of the frame of the apparatus. The set screw 86 permits adjustment of the position of the cylinder 36 to provide for changes in the length of the film sections to be used in the forming operation.

The structure which is employed at the forming station for confining the plastic film during the heating and forming steps is illustrated in FIGURES 8 through 17. This structure includes the frame members 40 and 42 previously described and also the means for operating the frame members to provide for forming of the plastic film.

The upper frame member 40 includes extensions 88, 90 and 92. These extensions are adapted to be received on a shaft 94 which provides a pivotal connection with the lower frame 42. A lift bar 96 is fixed between the extensions 88 and 90 and this bar cooperates in the raising of the upper frame 40 in a manner to be described.

Extensions 98, 100 and 102 formed in the lower frame 42 are also connected to the shaft 94. The extensions 98 and 100 include depending members 104 and 106, respectively, and a cross bar 108 is secured between these members. A cylinder 110 and piston 112 are supported on this cross bar. The link 114 operatively connects the cylinder 112 with the shaft 94 whereby the piston and cylinder arrangement will enable pivoting of the members 40 and 42 with the aid of lift bar 96.

A switch arm 115 is rigidly connected to the shaft 94 and this arm moves into contact with switch 117 when the frame 42 is lowered. The forming operation, which takes place after the frame 42 has been lowered, can be initiated when the switch 117 has been closed.

FIGURES 12 and 13 illustrate a means for holding the frame members 40 and 42 tightly together during the forming operation. This mechanism includes a link 116 fixed to the shaft 94 and an associated link 118 connected to latch bar 120 which is slideably received on the rear side of the frame 42. The bar 120 terminates in a latching tongue 122 and the bar is adapted to reciprocate as the frame member 40 is raised and lowered.

The frame member 40 includes a keeper 124 which defines an inturned end portion 126 (see FIGURE 15). The keeper 124 is adapted to receive the latching tongue 122 when the frame members are moved together.

The assembly, including the frame members 40 and 42, is mounted over a stationary structure 128 and the frame assembly is adapted to be vertically moved relative to this stationary structure. This movement of the frame assembly is effected by means of a piston 130 which is received in a sleeve 132 attached to the structure 128. Vertical movement of the frame assembly is necessary in order to permit movement of the clamping means 18 across the forming station during positioning of a film section for forming.

As shown in FIGURE 8, the frame structure, including the members 40 and 42, is adapted to receive means 134 which are provided for determining the extent of shaping of the film to be formed. The members 134 are adapted to be moved relative to each other within the frame whereby shaping operations utilizing various sizes of plastic film can be carried out. As previously noted, the clamping means 30 can be adjusted, and, therefore, the size of the film section which is moved into the forming station can be changed in accordance with the size defined by the members 134. Furthermore, the switch actuating means 56 which engages the switch 60 to determine the extent of travel of the clamping means 18 can be adjusted in accordance with the desired size of a film section.

In the operation of the described apparatus, the leading end of the film 13 is clamped by the clamping means 18 and this leading end is then pulled across a forming station 14. The clamping means 30 then operate to provide for holding of the leading end of the film and clamping means 18 are then retracted. The piston 130 is operated to move the frame assembly to the upper position and the upper frame 40 is then moved into clamping position with respect to the frame 42.

The heater 16 is now moved into position, and, at this time, the slitting means 50 cut the film to remove the section to be formed from the sheet 13. The film is heated while maintained within the frame assembly and the vacuum means is then actuated to provide for forming of the film. In order to provide a secure vacuum within the confines of the frame, felt padding 136 or the like is provided around the rim of the frame 40.

In the meantime, the opposite forming station is adapted to receive a film section to be formed, and when the heating means 16 is moved away from the one forming station, it can be moved directly to the opposite forming station to perform the slitting operation and to provide for heating of the film preparatory to actuation of the vacuum forming means. The frame members 40 and 42 are separated after the heating means has been moved to an opposite station and the formed material is removed at this time.

As previously noted, the apparatus of this invention is particularly suitable for the encasing of various articles with a plastic film. In a situation of this type, the articles are placed within the confines of the members 134 on the bottom of the frame member 42. When the vacuum is applied, the heated plastic film will be pulled down into contact with the articles and will completely confine them while assuming the shape which characterizes the articles. In many instances, a foraminous base may be located above the floor of the frame member 42 and the articles will be placed on this base. The effects of the vacuum will cause the plastic film to conform to the shape of the articles and to secure itself to the foraminous base whereby a unit suitable for merchandising of the articles can be achieved. A unit of this nature is particularly suitable from a merchandising standpoint since the articles can be viewed through the transparent film while the film provides protection.

It will be understood that various changes and modifications may be made in the above described apparatus which provide the characteristics of this invention without departing from the spirit thereof particularly as defined in the following claims.

That which is claimed is:

1. An apparatus for forming plastic film comprising a film supply means, a film forming station, first film clamping means, means for operating said first clamping means to move said film into said forming station, second clamping means adapted to engage said film in said forming station, means for releasing said first clamping means, a heating means for use in forming said film, means for positioning said heating means over said film when said first clamping means is released, film cutting means associated with said heating means adapted to sever a film section from the film supply during positioning of said heating means over the film, and means for forming said film section subsequent to positioning of said heating means.

2. An apparatus in accordance with claim 1 wherein said heating means is mounted for lateral movement relative to said film and wherein said cutting means severs said film transversely.

3. An apparatus in accordance with claim 1 wherein said first clamping means comprises a bar having upper and lower clamping portions extending across the width of said film, means for gripping the end of said film with said clamping portions, a piston means attached to said bar whereby said bar is adapted to move said end of the film into position for engagement by said second clamping means, and whereby said first clamping means can be retracted by said piston upon gripping of said film by said second clamping means and upon release by said clamping portions.

4. An apparatus in accordance with claim 1 wherein said forming means include a frame for confining means which define the shape to be formed in the film, said frame having a movable upper member and a lower member, means for closing said frame members to clamp said film section therebetween and a vacuum means associated with said lower frame member for forming said film section into the desired shape.

5. An apparatus for forming plastic film comprising a pair of film supply means, a film forming station associated with each of said supply means, first film clamping means in each of said stations, means for operating said first clamping means to move said film into said forming stations, second clamping means in each of said stations adapted to hold said film in said stations, means for releasing said first clamping means, and heating means located between said forming stations for use in forming said film, means for alternately positioning said heating means over the film in each of said stations when said first clamping means are released, and including film cutting means associated with said heating means for severing film sections from the film supply during positioning of said heating means.

6. An apparatus in accordance with claim 5 wherein said first clamping means comprises a bar having upper and lower clamping portions extending across the width of said film, means for gripping the end of said film with said clamping portions, a piston means attached to said bar whereby said bar is adapted to move said end of the film into position for engagement by said second clamping means, and whereby said first clamping means can be retracted by said piston upon gripping of said film by said second clamping means and upon release by said clamping portions.

7. An apparatus in accordance with claim 6 wherein said second clamping means comprise upper and lower jaw portions, openings defined in the clamping portions of said first clamping means adapted to receive said jaw portions, and wherein portions of said film extend into said openings when said film is gripped by said first clamping means, said second clamping means being adapted to be received in said openings when said first clamping means moves across a forming station whereby said second clamping means can grip said film.

8. An apparatus in accordance with claim 5 wherein said forming means each include a frame for confining means which define the shape to be formed in the film, said frame having a movable upper member and a lower member, means for closing said frame members to clamp said film section therebetween and a vacuum means associated with said lower frame member for forming said film section into the desired shape.

9. An apparatus in accordance with claim 8 wherein said upper and lower frame members are pivotally connected, means associated with the engaging edges of said frame members to provide a vacuum seal when said frame members are pivoted to clamping positions and means operating in response to pivoting of said frame members for locking them in position.

References Cited by the Examiner
UNITED STATES PATENTS

| | | | |
|---|---|---|---|
| 2,521,387 | 9/50 | Maynard et al. | 18—19 |
| 2,962,758 | 12/60 | Politis | 18—19 |
| 2,976,658 | 3/61 | Kostur. | |

WILLIAM J. STEPHENSON, *Primary Examiner.*